(12) United States Patent
Berne et al.

(10) Patent No.: US 12,039,629 B2
(45) Date of Patent: Jul. 16, 2024

(54) METHOD FOR ADAPTING AN OVERLAID IMAGE OF AN AREA LOCATED REARWARDS AND ALONG A VEHICLE SIDE

(71) Applicant: Volvo Truck Corporation, Gothenburg (SE)

(72) Inventors: Nicolas Berne, Heyrieux (FR); MinJuan Wang, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 79 days.

(21) Appl. No.: 17/797,129

(22) PCT Filed: Feb. 4, 2020

(86) PCT No.: PCT/EP2020/052763
§ 371 (c)(1),
(2) Date: Aug. 3, 2022

(87) PCT Pub. No.: WO2021/155914
PCT Pub. Date: Aug. 12, 2021

(65) Prior Publication Data
US 2023/0055195 A1    Feb. 23, 2023

(51) Int. Cl.
*G06T 11/60* (2006.01)
*G06T 11/00* (2006.01)
(Continued)

(52) U.S. Cl.
CPC ............ *G06T 11/00* (2013.01); *G06T 19/006* (2013.01); *G06V 20/20* (2022.01)

(58) Field of Classification Search
None
See application file for complete search history.

(56) References Cited

U.S. PATENT DOCUMENTS 9,346,467 B2 * 5/2016 Hahne ................... B60W 50/14
2008/0023170 A1    1/2008 Farkas et al.
(Continued)

FOREIGN PATENT DOCUMENTS

DE    102007007342 A1 * 10/2007 ......... B60H 1/00985
WO    2016026870 A1    2/2016
WO    2019202317 A1    10/2019

OTHER PUBLICATIONS

Adrian et al. DE 102017219876 Machine Translated (Year: 2018).*
(Continued)

*Primary Examiner* — Saptarshi Mazumder
(74) *Attorney, Agent, or Firm* — Sage Patent Group

(57) ABSTRACT

A method for adapting an overlaid image displayed on a monitor located in a cab of a vehicle including: defining a location on an embedded element of a vehicle side as a target on a captured image; processing the captured image by tracking the target position and by tracking at least one recognizable pattern linked to a horizontal dimension on the captured image; displaying on the monitor an overlaid image including the captured image and an adapting overlayer, the adapting overlayer including a pointer on the target and an overlaid element extending in an area of the captured image delimited horizontally defined with the orientation of the at least one recognizable pattern, on one side by the pointer and on the other side by a side of the monitor extending transversally to the horizontal dimension and corresponding to the cab position in the captured image.

12 Claims, 1 Drawing Sheet

(51) Int. Cl.
    *G06T 19/00*     (2011.01)
    *G06V 20/20*     (2022.01)

(56) References Cited

U.S. PATENT DOCUMENTS

| | | |
|---|---|---|
| 2008/0231701 A1 | 9/2008 | Greenwood et al. |
| 2010/0171828 A1* | 7/2010 | Ishii .................. B62D 15/0275 |
| | | 348/135 |
| 2012/0200706 A1 | 8/2012 | Greenwood et al. |
| 2016/0033251 A1 | 2/2016 | Pinkston et al. |
| 2016/0332516 A1 | 11/2016 | Kuehnle et al. |
| 2017/0272664 A1* | 9/2017 | Lang ...................... H04N 23/63 |

OTHER PUBLICATIONS

International Search Report and Written Opinion of the International Searching Authority, PCT/EP2020/052763, mailed Nov. 20, 2020, 15 pages.

* cited by examiner

METHOD FOR ADAPTING AN OVERLAID IMAGE OF AN AREA LOCATED REARWARDS AND ALONG A VEHICLE SIDE

CROSS REFERENCE TO RELATED APPLICATIONS

This application is a 35 U.S.C. § 371 national stage application of PCT International Application No. PCT/EP2020/052763 filed on Feb. 4, 2020, the disclosure and content of which is incorporated by reference herein in its entirety.

TECHNICAL FIELD

The invention relates to a method for adapting an overlaid image of an area located rearwards and along a vehicle side. The invention further relates to a vehicle for implementing said method.

The invention can be applied in light, medium and heavy-duty vehicles, such as trucks, buses and construction equipment.

BACKGROUND

A trend in industrial vehicles is to replace conventional mirrors by a camera assembly which comprises a camera arranged on an exterior part of a vehicle, for providing a captured image of a surrounding area of the vehicle, for example an area located rearwards and along a vehicle side. An image, resulting from the processing of the captured image, can be displayed on a monitor inside the driver's compartment.

It is of paramount importance that the image displayed provides the necessary visual information for the driver to ensure the safety of people and the integrity of objects and goods. For this reason, an overlaid element on the captured image could be necessary to help the driver.

Indeed, it could be difficult for the driver to evaluate distances when changing from mirrors to camera assemblies, the size of the rear part of the vehicle being harder to evaluate depending on the trailer angle.

The present invention aims to solve all or some of the disadvantages mentioned above.

SUMMARY

For this purpose, the present invention relates to a method for adapting an overlaid image displayed on a monitor located in a cab of a vehicle, the vehicle comprising at least one camera-monitor assembly provided with a control unit and a camera for providing a captured image of an area located rearwards and along one and/or the other vehicle side, the method comprising:
  defining a location on an embedded element of the vehicle side as a target on the captured image,
  processing the captured image by tracking the target position and by tracking at least one recognizable pattern linked to a horizontal dimension on the captured image,
  displaying on the monitor an overlaid image including the captured image and an adapting overlayer, the adapting overlayer comprising a pointer on the target and an overlaid element, the overlaid element extending in an area of the captured image delimited, horizontally according to the horizontal dimension defined with the orientation of the at least one recognizable pattern, on one side by the pointer and on the other side by a side of the monitor extending transversally to the horizontal dimension and corresponding to the cab position in the captured image.

According to an aspect of the invention, the at least one recognizable pattern includes a background element from the captured image. Preferably, the background element includes a line or an area delimiting the ground and the sky. In this case, the background is used to define the horizontal dimension.

According to another aspect of the invention, the at least one recognizable pattern includes an element of the vehicle shown in the captured image. Preferably, said element is comprised in the vehicle side as the vertical limit of the trailer. In this case, the horizontal dimension could be in a different frame of reference than the background. The horizontal dimension is possibly a straight or curved line.

The monitor is considered as a display means with a rectangular shape.

According to one aspect of the invention, the overlaid element is delimited on the overlaid image by a vertical line intersecting the pointer, the vertical line being transverse to the horizontal dimension.

The camera-monitor assembly is intended to replace a side mirror of the vehicle.

According to one aspect of the invention, the location corresponds to a geometrical point of the vehicle side, preferably visually defining the size of the vehicle side. In particular, the location of the embedded element can be a top rear corner of the vehicle side, low rear corner or another element part of a contour of the vehicle side shown on the captured image.

The method for adapting an overlaid image enables a driver of the vehicle to better evaluate distances when changing from mirrors to CMS. Indeed, although the vehicle side is visible in the monitor, it takes more or less space in the captured image depending on the vehicle side position.

In this context, the adapting overlayer gives a visual indication to the driver. The overlaid element is smaller at a low cab/vehicle side angle than at a high angle but the distance represented by the overlaid element is the same.

Another advantage of the method is that the adapting overlayer follows the vehicle side when turning. In addition, the field of vision is never obstructed by the adapting overlayer.

According to an aspect of the invention, the step of defining the target on the captured image is preceded by a step of selecting the location on the embedded element of the vehicle.

This allows the driver to define himself the most convenient location for the position of the pointer. The driver can therefore personalize the adapting overlayer according to his or her preferences.

According to an aspect of the invention, the step of selecting the location on the embedded element of the vehicle corresponds to a manual input.

According to one aspect of the invention, the manual input corresponds to a manual interaction with the monitor, the monitor being a touch screen. This allows a fast selection to define de location.

According to an aspect of the invention, the overlaid element corresponds to a part of a trajectory line of the location on the embedded element of the vehicle side.

This visual indication not only helps the driver to evaluate distances in the monitor but also gives a hint on the forecasted trajectory of the vehicle.

According to an aspect of the invention, a memory of the control unit comprises a plurality of trajectory lines, each corresponding to a position of the vehicle side with respect to the cab, the step of displaying the overlaid image including a selection of a proper trajectory line among the plurality of trajectory lines, the proper trajectory line intersecting the pointer.

This arrangement allows limiting the processing resources of the control unit as a move of the pointer is followed by a new selection of a proper trajectory line. The proper trajectory line should not be continuously calculated.

Preferably, the selection is done continuously to follow the displacement of the pointer. In particular, continuously means that the selection is done according to a defined frequency that could be variable depending on a tuned refreshing rate.

According to an aspect of the invention, the method for adapting the overlaid image comprises a step of calibration preceding the step of displaying the overlaid image and consisting in defining a correspondence between several positions of the target on the captured image and several relative positions of the cab and the vehicle side.

Preferably, the correspondence is used for defining the adapting overlayer according to the pointer position.

According to an aspect of the invention, said correspondence is saved in the memory together with an identification reference of a trailer on which the vehicle side is located.

This arrangement enables to have one calibration for a particular trailer that is used with the cab. By cab of the vehicle, it has to be understood tractor of the vehicle that is configured to cooperate with the trailer.

According to an aspect of the invention, the processing of the step of tracking the target position and of the step of displaying the overlaid image are interrupted by and resumed after at least one step of temporary uncoupling the trailer from the cab.

The fact that the correspondence is memorized together with the identifying reference of the trailer allows one or several temporarily uncoupling of the trailer without necessitating going through the steps of defining the target and calibrating the trajectory lines. According to an aspect of the invention, the defined target is memorized by the control unit.

According to an aspect of the invention, the method can be implemented several times with the same trailer. Preferably, an input step can be manually initiated to proceed to a reset and repeat the method. This enables for example to define a different target on the captured image.

According to one aspect of the invention, the relative positions of the cab and the vehicle side correspond to cab/vehicle side angles.

According to an aspect of the invention, the step of calibration is realized while driving by determining the correspondence during at least one turn of the vehicle.

This allows a simple calibration once the target is defined. One can to drive normally to define the correspondence. According to one aspect of the invention, the at least one turn comprises two turns. Preferably, the two turns are two turns in opposed directions.

According to an aspect of the invention, during the step of displaying the overlaid image, the or each trajectory line is cut at the pointer level and a fraction of said trajectory line is erased, said fraction starting from the pointer to the other side of the monitor that is extending transversally to the horizontal dimension and that is opposed to the cab position in the captured image.

According to an aspect of the invention, the method for adapting the overlaid image is carried out for several distinct targets on the captured image to display several corresponding adapting overlayers in the overlaid image.

The adapting overlayers move continuously as each pointer is following its corresponding target. The overlaid elements are also permanently adapted with respect to the position of the pointers.

The overlaid image is then dynamic to help the driver assess distances without disturbing his vision, as the region of the image outside the vehicle side size is not covered.

The present invention also concerns a computer program comprising program code means for performing the steps of any of the method for adapting the overlaid image displayed on the monitor located in the cab of the vehicle when said program is run on the control unit.

The present invention further concerns a control unit for controlling at least one camera-monitor assembly of a vehicle, the control unit being configured to perform the steps of the method for adapting the overlaid image displayed on the monitor located in the cab of the vehicle.

The invention also concern a vehicle comprising a control unit as disclosed above.

The different aspects defined above that are not incompatible can be combined.

BRIEF DESCRIPTION OF THE DRAWINGS

The invention will be better understood with the aid of the detailed description that is set out below with reference to the appended drawing in which.

DETAILED DESCRIPTION OF EXAMPLE EMBODIMENTS OF THE INVENTION

Figure 1:
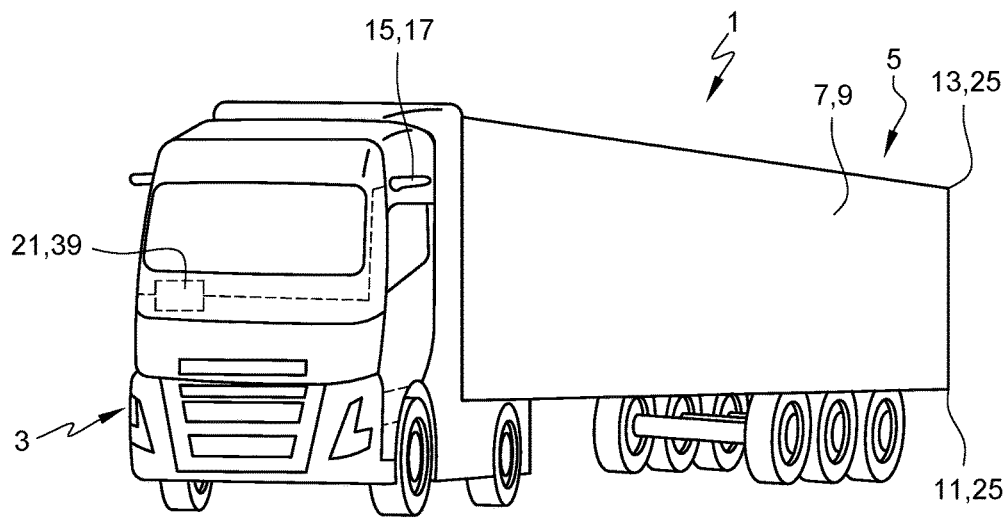
FIG. 1 is a perspective view of a vehicle comprising a trailer.

As illustrated in FIG. 1, a vehicle 1 and more specifically an industrial vehicle is disclosed. Although the invention will be described with respect to a truck, the invention is not restricted to this particular vehicle 1, but may also be used in other vehicles, such as a bus.

The vehicle 1 comprises a cab 3 or tractor. The cab 3 defines a driver compartment. The vehicle 1 can also be configured to include a trailer 5 connected both mechanically and electrically to the cab 3, as shown in FIG. 1.

The trailer 5 is supported by wheels and comprises a side wall 7 also referred to as vehicle side 9. The vehicle side 9 has a lower rear corner 11 and a top rear corner 13.

Figure 2:
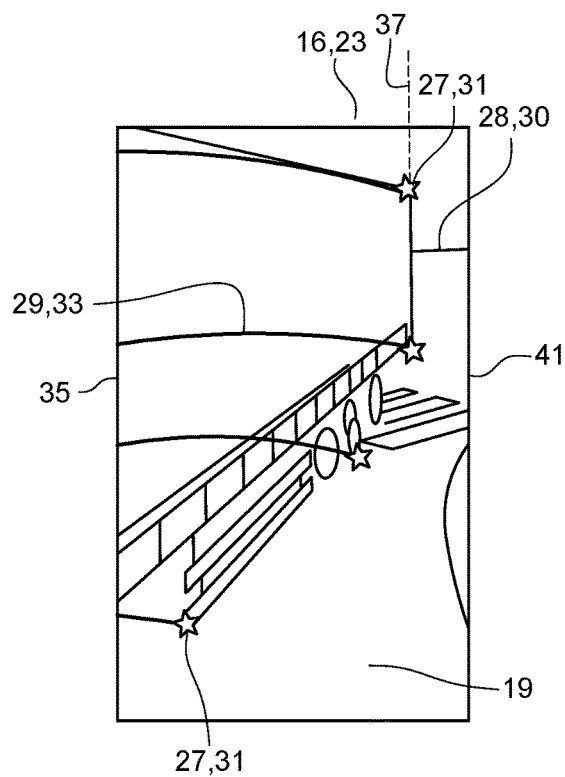
FIG. 2 is a overlaid image displayed on a monitor inside the vehicle.

Furthermore, a camera-monitor assembly 15 comprises a camera 17 for providing a captured image 19 as shown in FIG. 2 of an area located rearwards and along the vehicle side 9, the camera 17 thus replacing a conventional side exterior mirror of the vehicle 1.

Here only one camera-monitor assembly 15 is described. However, the vehicle 1 can be equipped with two of such camera-monitor assemblies 15, the second being located on the other side of the cab 3.

The camera-monitor assembly 15 further includes a monitor 16 inside the driver's compartment for displaying an image resulting from the processing of the image provided by the camera 17. The camera-monitor assembly 15 further comprises a control unit 21.

The control unit 21 is configured to receive data from various sensors or components of the vehicle 1, to process this data, to control the operation of various components of the vehicle 1, possibly depending on the information received. The control unit 21 is exemplified as an electronic control unit that may be adapted to control working vehicle operations and/or to process data relevant for the operation of the vehicle 1. As non-limiting and non-exhaustive examples, the feature "processing data" may include one or more of determining, storing, transmitting or receiving data.

Figure 3:
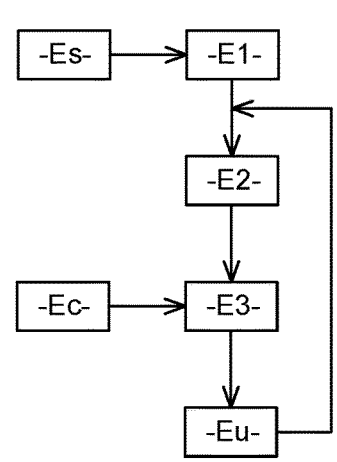
FIG. 3 is a diagram of a method for adapting an overlaid image.

As shown in FIGS. 2 and 3, there is provided a method for adapting an overlaid image 23 displayed on the monitor.

The method comprises a step E1 consisting in defining at least one location 25 on an embedded element of the vehicle side 9 as target 27 on the captured image 19. Here several locations 25 and corresponding targets 27 are defined.

The step E1 of defining the target 27 on the captured image 19 is preceded by a step Es of selecting the locations 25 on embedded elements of the vehicle side 9.

The locations 25 correspond to geometrical points of the vehicle side 9, preferably visually defining the size of the vehicle side 9. In FIG. 2, four locations have been defined and exemplified including the top rear corner 13, the lower rear corner 11 or other elements part of a contour of the vehicle side 9.

The step Es of selecting the locations on the embedded elements of the vehicle corresponds to a manual input. The manual input corresponds to a manual interaction with the monitor 16, the monitor 16 being for example a touch screen. The defined targets 27 are stored by the control unit 21.

Then, the method comprises a step E2 consisting in processing the captured image 19 by tracking the positions of the targets 27 and by tracking at least one recognizable pattern 28 linked to a horizontal dimension 30 on the captured image 19.

As illustrated in FIG. 2, the at least one recognizable pattern 28 includes a background element from the captured image 19 and more particularly a line or an area delimiting the ground and the sky. The horizontal dimension 30 is possibly a straight or curved line depending on the captured image 19.

Alternatively, the at least one recognizable pattern 28 can include an element of the vehicle 1 shown in the captured image 19.

The method comprises a step E3 consisting in displaying on the monitor 16 the overlaid image 23 including the captured image 19 and adapting overlayers 29, each adapting overlayer 29 corresponding to a target 27.

Each adapting overlayer 29 comprises a pointer 31 on the target 27 and an overlaid element 33, the overlaid element 33 extending in an area of the captured image delimited on one side by the pointer 31 and on the other side by a side 35 extending transversally to the horizontal dimension and of the monitor 16 corresponding to the cab 3 position in the captured image 19.

This delimitation is considered horizontally according to the horizontal dimension 30 defined with the orientation of the at least one recognizable pattern 28

The monitor 16 can be a display means having a rectangular form.

The overlaid element 33 is delimited on the overlaid image 23 by a vertical line 37 intersecting the pointer 31, the vertical line 37 being transverse to the horizontal dimension 30. The overlaid element 33 corresponds to a part of a trajectory line of the location on the embedded element of the vehicle side 9.

A memory 39 of the control unit 21 comprises a plurality of trajectory lines, each corresponding to a position of the vehicle side 9 with respect to the cab 3.

The step E3 of displaying the overlaid image 23 includes a selection of a proper trajectory line among the plurality of trajectory lines, the proper trajectory line intersecting the pointer 31.

The selection is done continuously to follow the displacement of the pointer 31. In particular, continuously means that the selection is done according to a defined frequency that could be variable depending on a tuned refreshing rate.

During the step E3 of displaying the overlaid image 23, the or each trajectory line is cut at the pointer 31 level and a fraction of said trajectory line is erased, said fraction starting from the pointer 31 to the other side 41 of the monitor that is extending transversally to the horizontal dimension 30 and that is opposed to the cab 3 position in the captured image 19.

The method also comprises a step Ec of calibration preceding the step E3 of displaying the overlaid image 23 and consisting in defining a correspondence between several positions of the target 27 on the captured image 19 and several relative positions of the cab 3 and the vehicle side 9.

The relative positions of the cab 3 and the vehicle side 9 correspond to cab/vehicle side angles. The correspondence is used for defining the adapting overlayer 29 according to the pointer 31 position.

Said correspondence is saved in the memory 39 of the control unit 21 together with an identification reference of a trailer 5 on which is located the vehicle side 9.

The step Ec of calibration is realized while driving by determining the correspondence during at least one turn of the vehicle. The at least one turn comprises two turns. Preferably, the two turns are two turns in opposed directions.

The processing of the step E2 of tracking the target position and the step E3 of displaying the overlaid image 23 can be interrupted by and resumed after at least one step Eu of temporary uncoupling the trailer 5 from the cab 3.

The method can also be implemented several times with the same trailer 5 to modify the targets 27. An input step can be manually initiated to proceed to a reset and repeat the method.

A computer program comprising program code means for performing the steps of the method for adapting an overlaid image 23 displayed on the monitor 16 located in the cab 3 of the vehicle 1 is run on the control unit 21.

The method for adapting an overlaid image enables a driver of the vehicle to better evaluate distances when changing from mirrors to CMS. Indeed, although the vehicle side 9 is visible in the monitor 16, it takes more or less space in the captured image depending on the vehicle side 9 position.

Another advantage of the method is that the adapting overlayer follows the vehicle side when turning. In addition, the field of vision is never obstructed by the adapting overlayer.

This visual indication not only helps the driver to evaluate distances in the monitor but also gives a hint on the forecasted trajectory of the vehicle.

It is to be understood that the present invention is not limited to the embodiments described above and illustrated in the drawings; rather, the skilled person will recognize that many changes and modifications may be made within the scope of the appended claims.

The invention claimed is:

1. A method for adapting an overlaid image, the method comprising:
   defining, by a control unit comprising a processor, a plurality of trajectory lines based on a correspondence between positions of a target of a vehicle side and positions of the vehicle side relative to a cab, the positions of a target captured by a rearward-directed camera of a vehicle during at least one turn of the vehicle;
   receiving, by the control unit, a captured image captured by the camera of the vehicle;
   selecting, by the control unit, a proper trajectory line from the plurality of trajectory lines based on a position of the vehicle side relative to the cab; and
   causing, by the control unit, display of the captured image and an adapting overlayer comprising a pointer illustrating the target and an overlaid element comprising at least a portion of the proper trajectory line, the overlaid element being horizontally delimited between the pointer and a side of the captured image corresponding to the cab of the vehicle.

2. The method for adapting the overlaid image according to claim 1, wherein defining, by the computer device, the plurality of trajectory lines based on the correspondence between positions of the target of the vehicle side and positions of the vehicle side relative to the cab further comprises:
   defining the target on the captured image by selecting a location on an embedded element of the vehicle.

3. The method for adapting the overlaid image according to claim 2, wherein selecting the location on the embedded element of the vehicle corresponds to a manual input.

4. The method for adapting the overlaid image according to claim 1, wherein the overlaid element corresponds to a part of the proper trajectory line of the location on an embedded element of the vehicle side.

5. The method for adapting the overlaid image according to claim 4, wherein causing, by the control unit, display of the captured image and the adapting overlayer further comprises:
   the proper trajectory line intersecting the pointer.

6. The method for adapting the overlaid image according to claim 4, wherein, causing display of the captured image and the adapting overlayer further comprises:
   the trajectory line being cut at the pointer level and a fraction of the trajectory line is erased, the fraction starting from the pointer to a side of the captured image opposed to the cab position in the captured image.

7. The method for adapting the overlaid image according to claim 1, wherein the correspondence is saved in a memory together with an identification reference of a trailer on which the vehicle side is located.

8. The method for adapting the overlaid image according to claim 7, wherein defining the plurality of trajectory lines and causing display of the captured image and the adapting overlayer are interrupted by and resumed after temporary uncoupling the trailer from the cab.

9. The method for adapting the overlaid image according to claim 1, wherein the relative positions of the cab and the vehicle side correspond to angles between the cab and vehicle side.

10. The method for adapting the overlaid image according to claim 1, carried out for several distinct targets on the captured image to display several corresponding adapting overlayers in the overlaid image.

11. A non-transitory computer readable medium comprising a computer program comprising program code for performing the steps of claim 1 of the method for adapting the overlaid image when said program is run on the control unit.

12. A control unit for controlling at least one camera-monitor assembly of a vehicle, the control unit being configured to:
   define a plurality of trajectory lines based on a correspondence between positions of a target of a vehicle side and positions of the vehicle side relative to a cab, the positions of a target captured by a rearward-directed camera of a vehicle during at least one turn of the vehicle;
   receive a captured image captured by the camera of the vehicle;
   select a proper trajectory line from the plurality of trajectory lines based on a position of the vehicle side relative to the cab; and
   cause display of the captured image and an adapting overlayer comprising a pointer illustrating the target and an overlaid element comprising at least a portion of the proper trajectory line, the overlaid element being horizontally delimited between the pointer and a side of the captured image corresponding to the cab of the vehicle.

* * * * *